United States Patent [19]
Orfei et al.

[11] 3,711,991
[45] Jan. 23, 1973

[54] MAGNETIC EDUCATIONAL VEHICLE

[75] Inventors: John B. Orfei, N. Revere; Henry Shapiro, Framingham, both of Mass.

[73] Assignee: American Science & Engineering Inc., Cambridge, Mass.

[22] Filed: March 24, 1971

[21] Appl. No.: 127,743

[52] U.S. Cl. ..................48/236, 46/202, 46/238, 35/19 A
[51] Int. Cl. .............................................A63h 33/26
[58] Field of Search................46/202, 216, 236, 238; 35/19 A

[56] References Cited

UNITED STATES PATENTS 3,303,606  2/1967  Mann ................................46/236 X
2,540,216  2/1951  Quinby..............................46/216 X

FOREIGN PATENTS OR APPLICATIONS 690,485  7/1964  Canada ..................................46/238

Primary Examiner—Louis G. Mancene
Assistant Examiner—Robert F. Cutting
Attorney—Charles Hieken

[57] ABSTRACT

A magnetic educational vehicle is made of formed plastic and includes at one end a U-shaped recess for accommodating a U-shaped magnet with its legs oriented in the horizontal plane and at the other end an I-shaped recess for accommodating the same magnet with its legs aligned in the vertical plane. A pair of such vehicles help illustrate the principles of magnetic attraction and repulsion. By orienting the magnets with like poles opposed, pushing one vehicle causes the other to move away.

6 Claims, 2 Drawing Figures

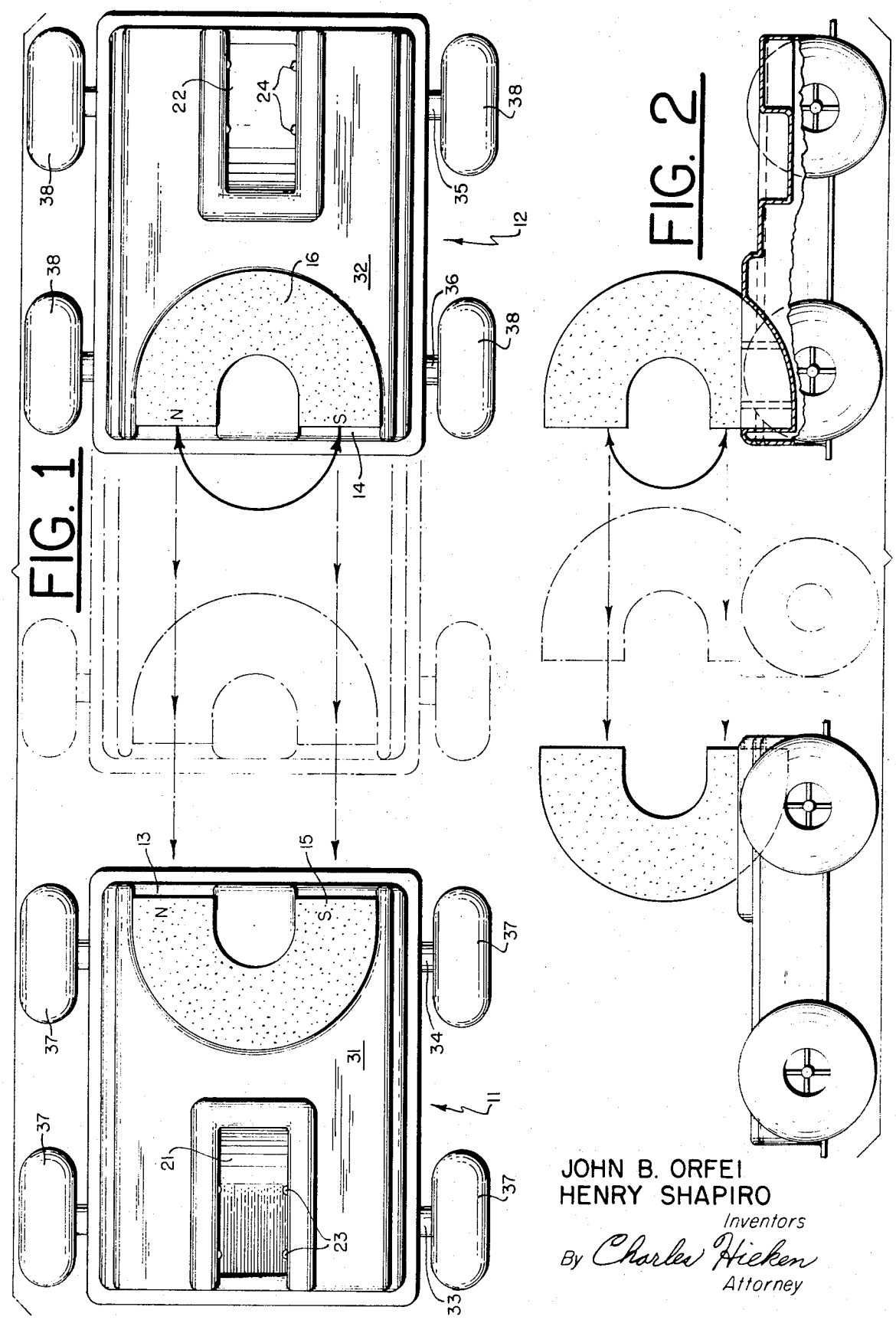

MAGNETIC EDUCATIONAL VEHICLE

BACKGROUND OF THE INVENTION

The present invention relates in general to magnetic educational vehicles and more particularly concerns a novel inexpensive plastic vehicle arranged to support a U-shaped magnet horizontally or vertically so that a like pair of vehicles may be used to illustrate the principles of magnetic repulsion and attraction.

It is an important object of this invention to provide an inexpensive safe vehicle that will be of interest to children while helping teach them principles of magnetic attraction and repulsion.

It is another object of this invention to achieve the preceding object while helping to keep powerful magnets so positioned that the principle of magnetic repulsion is readily illustrated.

It is a further object of the invention to achieve one or more of the preceding objects while keeping costs low.

SUMMARY OF THE INVENTION

According to the invention, a vehicle is formed with a U-shaped recess at one end for snugly accommodating a U-shaped magnet horizontally and an I-shaped recess at the other end for accommodating the same magnet vertically. These recesses are above respective axles of the vehicle.

A pair of vehicles according to the invention may then be used to teach principles of magnetic attraction and repulsion. Typically each vehicle has its associated U-shaped magnet seated in the U-shaped recess. With the U-shaped magnets oriented so that opposed poles are of the same sense, the magnets repel. When the child pushes one of the vehicles toward the other with the magnets thus oriented, such other vehicle moves away from the vehicle being pushed. If the magnets are arranged with poles of opposite sense facing each other, the two vehicles are drawn together.

With the magnets associated with each car vehicle seated in a recess of generally I-shaped cross section, the principles may be demonstrated similarly except that the respective magnets are then oriented in the vertical plane.

Numerous other features, objects, and advantages of the invention will become apparent from the following specification when read in connection with the accompanying drawing in which:

BRIEF DESCRIPTION OF THE DRAWING

FIG. 1 is a top view of a pair of vehicles according to the invention with the opposed magnets oriented horizontally in the U-shaped grooves; and FIG. 2 is a side view of a pair of vehicles according to the invention with the opposed magnets oriented vertically.

DETAILED DESCRIPTION OF PREFERRED EMBODIMENTS

With reference now to the drawing, and more particularly FIG. 1 thereof, there is shown a top view of a pair of like vehicles 11 and 12 according to the invention. Each of the vehicles include generally U-shaped recesses 13 and 14 extending across most of the width of each vehicle for snugly accommodating U-shaped magnets 15 and 16, respectively. Vehicles comprising a wheeled body means of low magnetic permeability 11 and 12 are also formed with recesses 21 and 22, respectively, of generally I-shaped cross section in the horizontal plane curved to accommodate one of the legs of an associated magnet 15 and 16 with the bumps such as 23 and 24 helping to snugly accommodate an associated magnet when seated therein. Bodies 31 and 32 of vehicles 11 and 12 are preferably made of thermoformed lightweight plastic to keep costs low while making the vehicles relatively difficult to break. Axles 33 and 34 are beneath recesses 21 and 13 of vehicle 11, and similar axles 35 and 36 are beneath recesses 22 and 14, respectively. Axles 33 and 34 carry wheels 37 at each end and axles 35 and 36 carry wheels 38 at each end so that the vehicles may roll easily.

With magnets 15 and 16 seated in recesses 13 and 14, respectively, as shown and oppositely sensed poles facing each other, vehicles 11 and 12 move together as generally indicated by the dashed-dotted outline. With like poles facing each other, vehicles 11 and 12 would be repelled. One might propel one of vehicles 11 or 12 toward the other and they might assume a relative position indicated by the dashed-dotted line and then bounce apart so that the opposed magnets were functioning effectively as a magnetic spring. A child might push one of the vehicles 11 and 12 and the other of the vehicles would move away from the pushed vehicle. A feature of the invention is that this type of magnetic repulsion, an unstable condition, may be illustrated to children in a relatively stable arrangement whereby the effect of the repulsion may be observed for a relatively long time as the child pushes one of the vehicles while the other retreats.

Referring to FIG. 2, there is shown still another arrangement of the vehicles according to the invention with magnets 15 and 16 seated in recesses 21 and 22, respectively, of generally I-shaped cross-section. Vehicle 12 is shown partially in section to illustrate how a magnet is snugly accommodated. In FIG. 2 vehicles 11 and 12 carry magnets 15 and 16, respectively, in recesses 21 and 22, respectively. With like poles of magnets 15 and 16 opposed, vehicle 12 might be propelled toward vehicle 11 to a position represented by the dashed-dotted outline and then repelled in a manner similar to that described above. Alternately, if unlike poles were opposed, vehicles 11 and 12 would be drawn together. The arrangement of FIG. 2 requires the child to position vehicles 11 and 12 more precisely than is required with the arrangement of FIG. 1 to illustrate repulsion when like pole faces are opposed. However, the child thus learns of the unstable equilibrium involved when like pole faces are opposed and quickly grasps the concept that unlike pole faces attract each other. To this end it is advantageous to designate the poles on the magnet with N indicating north pole and S indicating the south pole.

The invention just described is characterized by educational value and play value for children. It is low in cost and rugged. It is evident that those skilled in the art may now make numerous uses and modifications of and departures from the specific embodiments described herein without departing from the inventive concepts. Consequently, the invention is to be construed as embracing each and every novel feature and novel combination of features present or possessed by the apparatus and techniques herein disclosed and limited solely by the spirit and scope of the appended claims.

What is claimed is:

1. Magnetic educational toy comprising,
a U-shaped permanent magnet,
a wheeled body means of low magnetic permeability formed with a U-shaped recess at one end extending across most of the width of said body means and a recess of generally I-shaped cross section at the other end for accommodating the same U-shaped permanent magnet in normally horizontal or normally vertical positions respectively of said magnet,
said U-shaped permanent magnet being seated in one of said recesses.

2. Magnetic educational apparatus in accordance with claim 1 and further comprising a second of said wheeled body means,
a second U-shaped permanent magnet the same as said first-mentioned U-shaped permanent magnet, said second U-shaped permanent magnet being seated in the recess of said second wheeled body means corresponding to said one of said recesses in which said first-mentioned U-shaped permanent magnet is seated.

3. Magnetic educational apparatus in accordance with claim 2 wherein said one recess is said U-shaped recess and both said magnets are horizontally oriented with like pole faces opposed.

4. Magnetic educational apparatus in accordance with claim 2 wherein said one recess is said recess of I-shaped cross section and said U-shaped magnets have like pole faces opposed.

5. Magnetic educational apparatus in accordance with claim 2 wherein said one recess is said U-shaped recess and both said magnets are horizontally oriented with unlike pole faces opposed.

6. Magnetic educational apparatus in accordance with claim 2 wherein said one recess is said recess of I-shaped cross section and said U-shaped magnets have unlike pole faces opposed.

* * * * *